United States Patent
Denoue et al.

(10) Patent No.: US 10,929,365 B2
(45) Date of Patent: Feb. 23, 2021

(54) AUTOMATIC GENERATION OF ANIMATED PREVIEWS FOR PRESENTING DOCUMENT DIFFERENCES IN ENTERPRISE MESSAGING

(71) Applicant: FUJI XEROX CO., LTD., Tokyo (JP)

(72) Inventors: Laurent Denoue, Vento (IT); Scott Carter, Menlo Park, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 23 days.

(21) Appl. No.: 16/019,314

(22) Filed: Jun. 26, 2018

(65) Prior Publication Data
US 2019/0392057 A1   Dec. 26, 2019

(51) Int. Cl.
*G06F 16/21* (2019.01)
*G06K 9/00* (2006.01)
*G06T 13/80* (2011.01)
*G06F 16/338* (2019.01)
*G06F 16/2457* (2019.01)

(52) U.S. Cl.
CPC ...... *G06F 16/219* (2019.01); *G06F 16/24578* (2019.01); *G06F 16/338* (2019.01); *G06K 9/00456* (2013.01); *G06K 9/00483* (2013.01); *G06T 13/80* (2013.01)

(58) Field of Classification Search
CPC .............. G06F 16/219; G06F 16/338; G06F 16/24578; G06K 9/00456; G06K 9/00483; G06T 13/80
See application file for complete search history.

(56) References Cited

U.S. PATENT DOCUMENTS

| | | | |
|---|---|---|---|
| 8,386,504 B1* | 2/2013 | Wood | G06F 16/284 707/758 |
| 9,507,520 B2* | 11/2016 | Koenig | G06F 3/0488 |
| 2006/0136510 A1* | 6/2006 | Voronov | G06F 17/2288 |
| 2007/0162441 A1* | 7/2007 | Idicula | G06F 16/1873 |
| 2007/0260996 A1* | 11/2007 | Jakobson | G06F 17/2288 715/781 |
| 2012/0233137 A1* | 9/2012 | Jakobson | G06F 3/04847 707/695 |
| 2013/0124952 A1* | 5/2013 | Frem | G06F 40/194 715/202 |

(Continued)

OTHER PUBLICATIONS

Woodruff, A. et al. "A Comparison of the Use of Text Summaries, Plain Thumbnails, and Enhanced Thumbnails for Web Search Tasks." Journal of the Association for Information Science and Technology; Jan. 15, 2002, pp. 172-185. (14 pages); vol. 53-Iss. 2.

(Continued)

*Primary Examiner* — Mandrita Brahmachari
(74) *Attorney, Agent, or Firm* — Procopio, Cory, Hargreaves & Savitch LLP

(57) ABSTRACT

Example implementations described herein are directed to detection of text and image differences between versions of documents (in particular, slide presentations), and generating an animation to indicate the differences between versions. Such example implementations can be implemented as an application layer on document platforms that otherwise do not have any features to indicate differences between document versions. Further, such implementations are also extendable to messaging applications for collaborative document editing.

19 Claims, 7 Drawing Sheets

(56) References Cited

U.S. PATENT DOCUMENTS

| | | | | |
|---|---|---|---|---|
| 2014/0082472 A1* | 3/2014 | Sitrick | ................... | G06F 17/24 |
| | | | | 715/229 |
| 2014/0173423 A1* | 6/2014 | Meisels | .................. | G06F 17/24 |
| | | | | 715/255 |
| 2015/0012528 A1* | 1/2015 | Kapadia | ................ | G06F 40/169 |
| | | | | 707/722 |
| 2016/0378734 A1* | 12/2016 | Mullins | ................ | G06F 40/131 |
| | | | | 715/229 |
| 2017/0286767 A1* | 10/2017 | Panferov | ............ | G06K 9/00463 |
| 2017/0357479 A1* | 12/2017 | Shenoy | ................... | G06F 3/167 |

OTHER PUBLICATIONS

Chevalier, F. et al. "Using Text Animated Transitions to Support Navigation in Document Histories" Proceedings of he SIGCHI Conference on Human Factors in Computing Systems; Apr. 2010, pp. 683-692 (11 pages); Atlanta, Georgia, USA.

Then, H. "Nonlinear Revision Control for Images." ACM Transactions on Graphics; Jul. 2011; (10 apges) vol. 30. No. 4; New York, NY, USA.

* cited by examiner

Smart Contracts

Current paper-based systems drive $18 trillion in transactions per year.

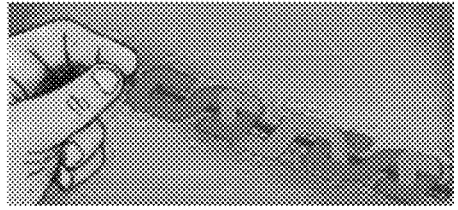

Consensus protocols are key to determining the sequence of actions resulting from the contract's code.

This enables peer-to-peer trading of everything from renewable energy to automated hotel room bookings.

FIG. 1(a)

Smart Contracts on BlockChain

Current paper-based systems drive $24 trillion in transactions per year.

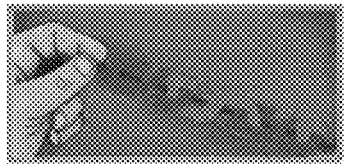

Consensus protocols are key to determining the correct sequence of actions resulting from the contract's code.

This enables peer-to-peer trading of everything from notarizing documents to automated hotel room bookings.

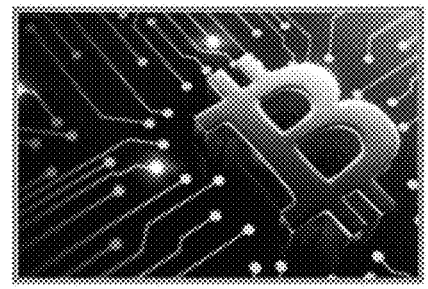

FIG. 1(b)

| User ID | Animation settings | Types of changes made | ... |
|---|---|---|---|
| U1 | A1 | CH1 | ... |
| U2 | A2 | CH2 | ... |
| U3 | A3 | CH3 | ... |
| U4 | A4 | CH4 | ... |
| ... | ... | ... | ... |

FIG. 4(a)

| Document | Versions | Flat Files | ... |
|---|---|---|---|
| D1 | V1 | NULL | ... |
| | V2 | F1 | ... |
| D2 | V1 | NULL | ... |
| | V2 | F1 | ... |
| | V3 | F2 | ... |
| ... | ... | ... | ... |

FIG. 4(b)

AUTOMATIC GENERATION OF ANIMATED PREVIEWS FOR PRESENTING DOCUMENT DIFFERENCES IN ENTERPRISE MESSAGING

BACKGROUND

Field

The present disclosure generally relates to document management, and more specifically, to the generation of animated previews for presenting document differences.

Related Art

Modern communication tools (e.g., e-mail, instant messaging) allow users to exchange updates to documents, slides or presentation files. Whether attached by email or posted to a chat channel, understanding what has changed between versions can be a time-consuming and frustrating experience.

Although some authoring tools provide functions to track changes, recipients need to open the corresponding application to see those changes. Many users also forget to use track changes. Further, for popular document types, track changes may not be readily available. Even if users open the document and try to find the changes (e.g., viewing the history of edits in platforms that provide such options), doing so is still time-consuming.

SUMMARY

In the related art, changes between documents are provided within the document platform itself (e.g., slide application, document application) or show text-only changes. Other related art implementations for image-based revision control focus on pixel-level changes only. There are no implementations in the related art involving providing an application that can be applied to document platforms (in particular, applications that do not indicate changes between document versions) that produce an abstracted animation of changes indicating all changes that occurred for text, image and graphics between document versions.

Aspects of the present disclosure include a method, which can involve processing a plurality of versions of a document comprising one or more slides for text differences and image differences between each of the plurality of versions; providing a first version of the plurality of versions of the document for display; and generating an animation transitioning the first version of the plurality of versions of the document to a second version of the plurality of versions of the document, the animation incorporating the text differences and the image differences between the first version and the second version.

Aspects of the present disclosure include a non-transitory computer readable medium, storing instructions for executing a process through one or more processors, the instructions involving processing a plurality of versions of a document comprising one or more slides for text differences and image differences between each of the plurality of versions; providing a first version of the plurality of versions of the document for display; and generating an animation transitioning the first version of the plurality of versions of the document to a second version of the plurality of versions of the document, the animation incorporating the text differences and the image differences between the first version and the second version.

Aspects of the present disclosure include a system, involving means for processing a plurality of versions of a document comprising one or more slides for text differences and image differences between each of the plurality of versions; means for providing a first version of the plurality of versions of the document for display; and means for generating an animation transitioning the first version of the plurality of versions of the document to a second version of the plurality of versions of the document, the animation incorporating the text differences and the image differences between the first version and the second version.

Aspects of the present disclosure include an apparatus, which can involve a processor configured to process a plurality of versions of a document comprising one or more slides for text differences and image differences between each of the plurality of versions; provide a first version of the plurality of versions of the document for display; and generate an animation transitioning the first version of the plurality of versions of the document to a second version of the plurality of versions of the document, the animation incorporating the text differences and the image differences between the first version and the second version.

BRIEF DESCRIPTION OF THE DRAWINGS

FIGS. 1(a) and 1(b) illustrate examples of slides in accordance with an example implementation.

FIGS. 4(a) and 4(b) illustrate example management information regarding user information and document information, in accordance with an example implementation.

DETAILED DESCRIPTION

Figure 2:
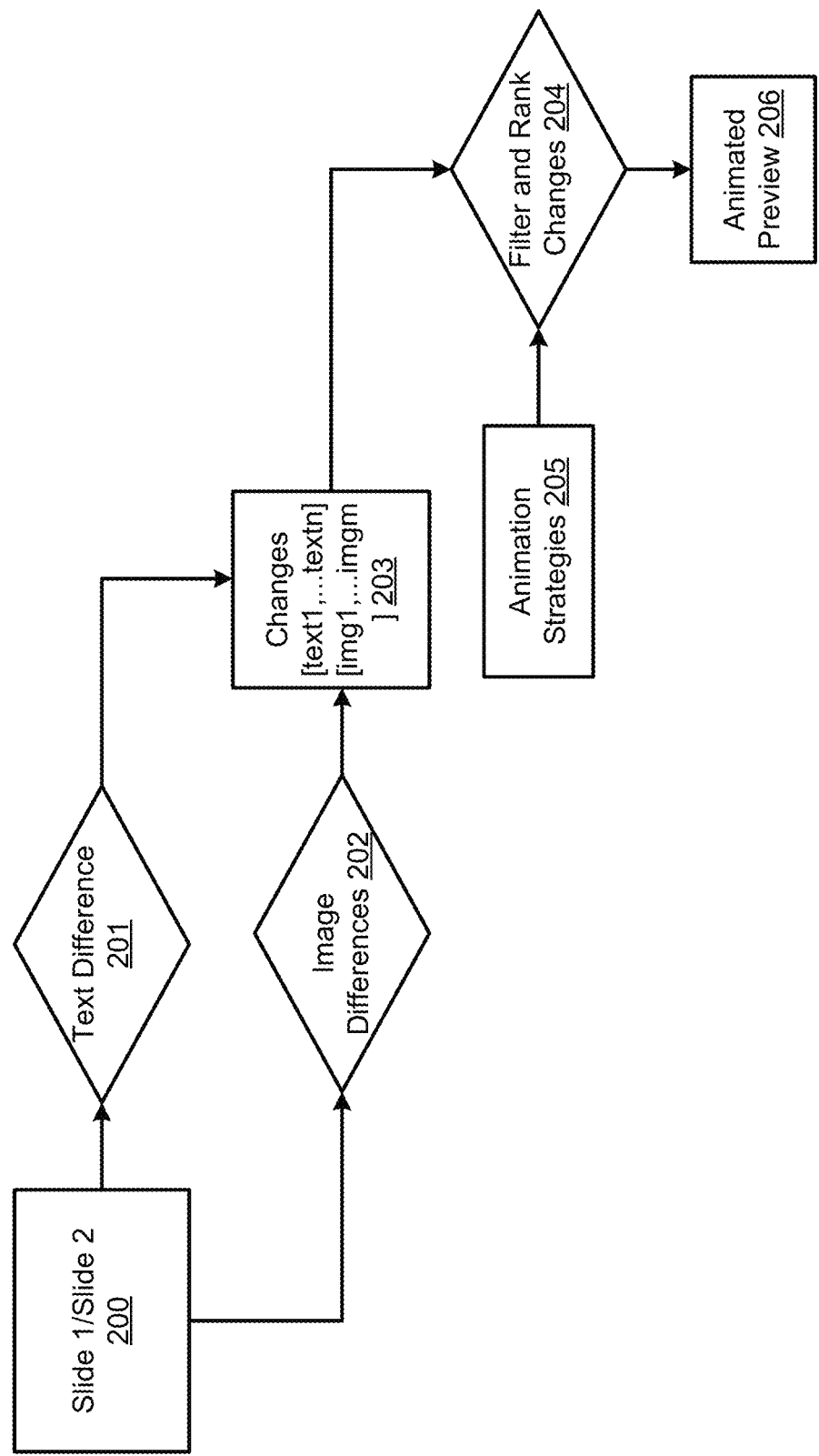
FIG. 2 illustrates an example overall flow in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve systems and methods to generate an animated preview of the differences, which take into account not only text changes, but also media changes as well (e.g., images added, removed, or resized). Example implementations involve techniques developed to animate transitions between such changes that mimic what operations a user did to edit the document, as well as involve techniques to emphasize motion to make the animated previews more effective. Finally, example implementations described herein involve the concept of an enhanced thumbnail, so that resulting animations can be posted as-is inside existing enterprise messaging applications in accordance with the desired implementation.

Documents are linked to or discussed within modern enterprise communication tools such as instant messaging. In an example, users directly upload a slide deck that needs reviewing and co-editing by a team, or post links to a presentation documents. When users from the team are done editing a part of the presentation, such users often post back a non-descriptive comment indicating a change has occurred (e.g., "Just finished my edits"), upload the new version of that document (e.g., a presentation file) or repost the link to the editable document for convenience to their peers. In another scenario, users may only refer to a document without explicitly uploading the document (e.g., sending a message indicating that a document is updated when the document is in a document repository over the cloud). Example implementations described herein are also configured to capture such messages to trigger comparing the latest version to the previously stored version of the document.

In all cases, there is a legitimate need to quickly assess what has changed in the document between the last version and its current version when the track changes platform is not available. Some related art applications may provide a static thumbnail of the first page, but such images do not communicate any information regarding what has changed between document versions. To determine such changes, users have to open the document, and either find the track-changes option or open the history of changes, assuming such document platforms make those options available.

Further, users communicating on such enterprise communication tools may not be operating on a desktop to open the document in full and understand edits that are made. In particular, a mobile device having limited screen space may not be able to load the document in its entirety to indicate all of the changes. Further, such mobile devices may not have the underlying document platform software available on the device, thereby making it impossible to load the document on the device to view the changes. Example implementations described herein can generate a preview through a representative slide, page, or portion of a document highlighting the most important changes as determined by an importance ranking. In this manner, a user utilizing the messaging platform on the mobile device can quickly look at an individual slide, page, or portion of a document indicating the important changes that is relevant to their use without having to resort to waiting until the user has access to a desktop.

Further, the underlying document platform may not have any functions to indicate the changes that are made to the document. Thus, even if the user loads the document through the document platform or through the messaging platform, the user will not be able to track what changes were made between versions of documents. Example implementations described herein facilitate an application layer that can be applied to the messaging platform and/or the document platform to provide functionality to indicating what changes were made between versions of documents through the generation of animations. Thus, example implementations described herein can add functionality through an application layer to document applications that may not readily have a track changes or edit history function available.

Example implementations described herein involve generating an animated preview of document changes, making it less time-consuming and more informative to knowledge workers, as well as facilitate a summary of changes for a device with limited screen capabilities such as a mobile device. There are many possible ways to visualize and/or animate changes between two or more versions of a slide or document (see the extensive literature on revision control and visualization). Example implementations involve the mimicking and extending what would have happened if the application window was recorded while the user edited a slide. That is, if the screen of the user is recorded when the user opens a slide deck at version 1 through a document platform, recorded when the user changes the slide deck to finally produce version 2 of the slide deck, such a "movie" could then be posted as an animated preview to show the changes between version 1 and version 2. Depending on the desired implementation, the "movie" can be in the form of a Hyper Text Markup Language (HTML) based animation, an animated image file (e.g. Graphics Interchange Format (GIF), Portable Network Graphics(PNG)), or can be in the form of a video file (e.g., Moving Picture Experts Group (MPEG)) and so on. Depending on the desired implementation, an interactive interface can also be provided wherein users could flip through the major changes in the animation, similar to video timelines but that snap to the relevant changes. Depending on the desired implementation, a recording may not be accessible, nor necessarily desirable since it may show too many useless edits such as typos, font size changes, numerous position adjustments to an image, and so on.

When such fine-grained information is accessible (e.g., history of edits, tracked changes) example implementations utilize the information when it is available. Additionally, the example implementations described herein are directed to providing a visualization for the main differences between the document versions. Consequently, example implementations can also generate an animation without knowing all the fine edits.

Through example implementations described above, it is possible to address technical issues revolving collaborative slide editing or document editing that is conducted over a messaging platform.

Detecting Document Changes

In example implementations, the first step can involve identifying the changes between two versions of documents. Example implementations can be extended to any format of documents. In the present disclosure, slides are utilized for examples as slides are independent units of content, compared to ever-changing paginations in generic documents. However, the present disclosure is not limited to slides, and can be modified to accommodate generic documents in accordance with the desired implementation. For example, such documents could be divided (or "slice up") the document around areas that have changed.

FIG. 2 illustrates an example overall flow in accordance with an example implementation. Given a set of slides, the first step automatically finds pairs of slides: this step uses text and image differences to rank possible matches. At 200, for a given pair of slides S1 and S2 for example from FIGS. 1(*a*) (referred to as S1) and 1(*b*) (referred to as S2) that are two versions of the "same" slide, the process starts from extracting the textual content of both slides along with its attributes (known as "attributed strings"), a data structure that contains the textual content along with its position and font attributes (e.g., size, color, family, style, weight), the image content of both slides such as image bitmap and attributes (e.g., position, transform like rotation), and the shapes of both slides such as lines (e.g., start, end, line style), and rectangles (e.g., textual content, position and styles) as illustrated at 201 and 202.

Information can also be provided from document platforms that provide information regarding changes, such as track changes, history of edits, or document object model (DOM). For example, DOM can be utilized to determine text boxes and their locations for a given slide in a slide platform application. If changes occurred for the text boxes and/or the locations, then those changes can be determined from the DOM.

Characterize Document Changes

Once content is extracted, the algorithm maps the contents to find their counterparts at 203. Differences can involve text differences and image differences.

Text differences can involve text content, position, font size, and font color. For such differences, the longest common subsequence algorithm is used to map textual elements between the first and second slide, and determine edits between each pair of attributed strings. FIG. 1(*b*) shows the edits found in the text in light grey.

Longest common subsequence can be applied to both documents that are static and editable documents. Longest common subsequence is a dynamic programming standard way of assessing deletes, replacements and additions in a text stream.

For image differences, the algorithm examines both sets of images and pairs them if an approximate content match is found, regardless of their transform property (e.g., two images will be found as matching even if S1 shows it rotated and S2 straight up). In the example of FIGS. 1(*a*) and 1(*b*), the first image in S1 is found to match the first image in S2. Such algorithms can be extended to examine image content, image position, and image size, as well as graphical content, position, size and color in accordance with the desired implementation.

The approximate image match ensures that two images are found to be matching even if one is cropped. For animation purposes, it is important to detect them as different versions of the "same" image because the animation like "popup" can be applied. If they are not found as related but rather one substituted the other, the animation would make the first image disappear and the second one appears later.

Figure 3A:
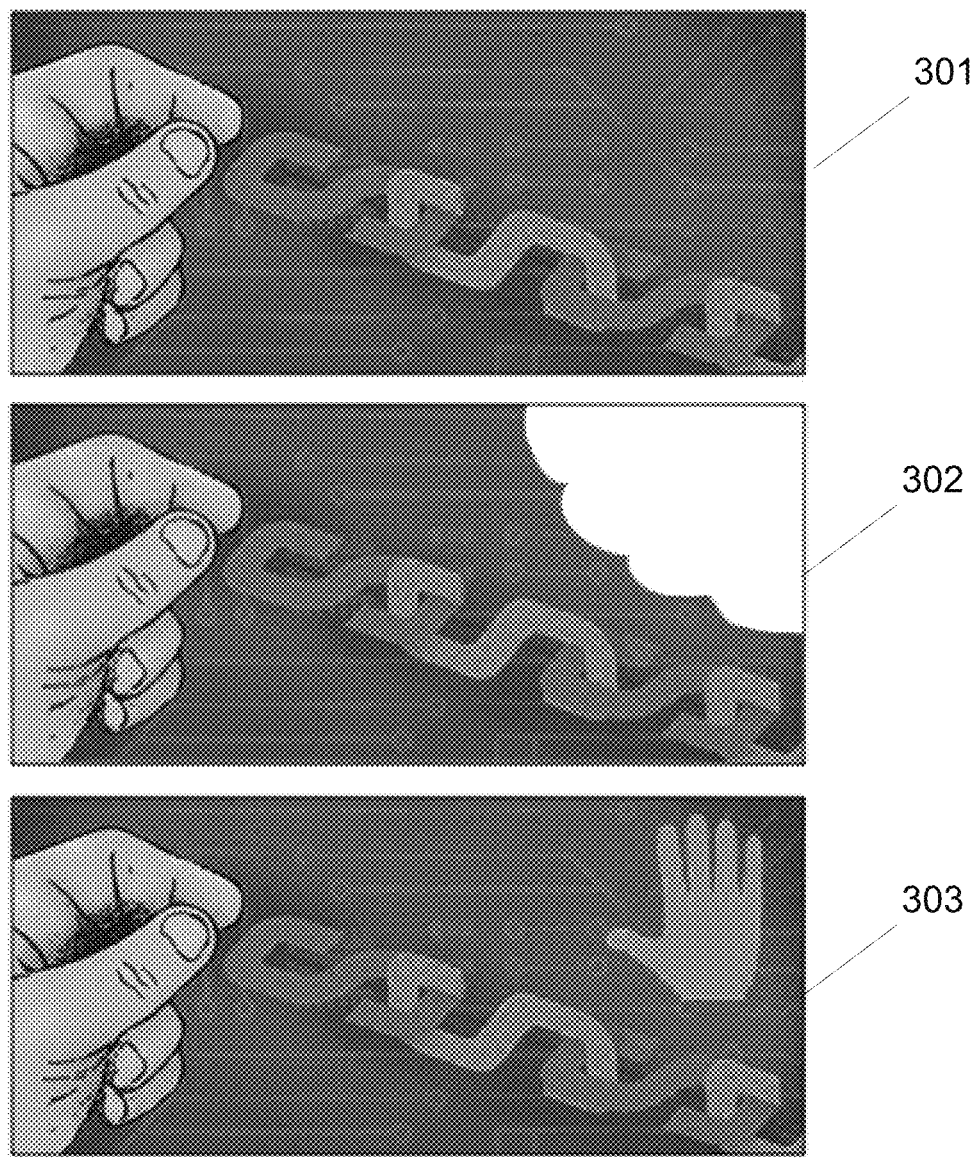
FIG. 3(a) illustrates an example animation involving the detection of a change within an image/chart/graph, in accordance with an example implementation.
Figure 3B:
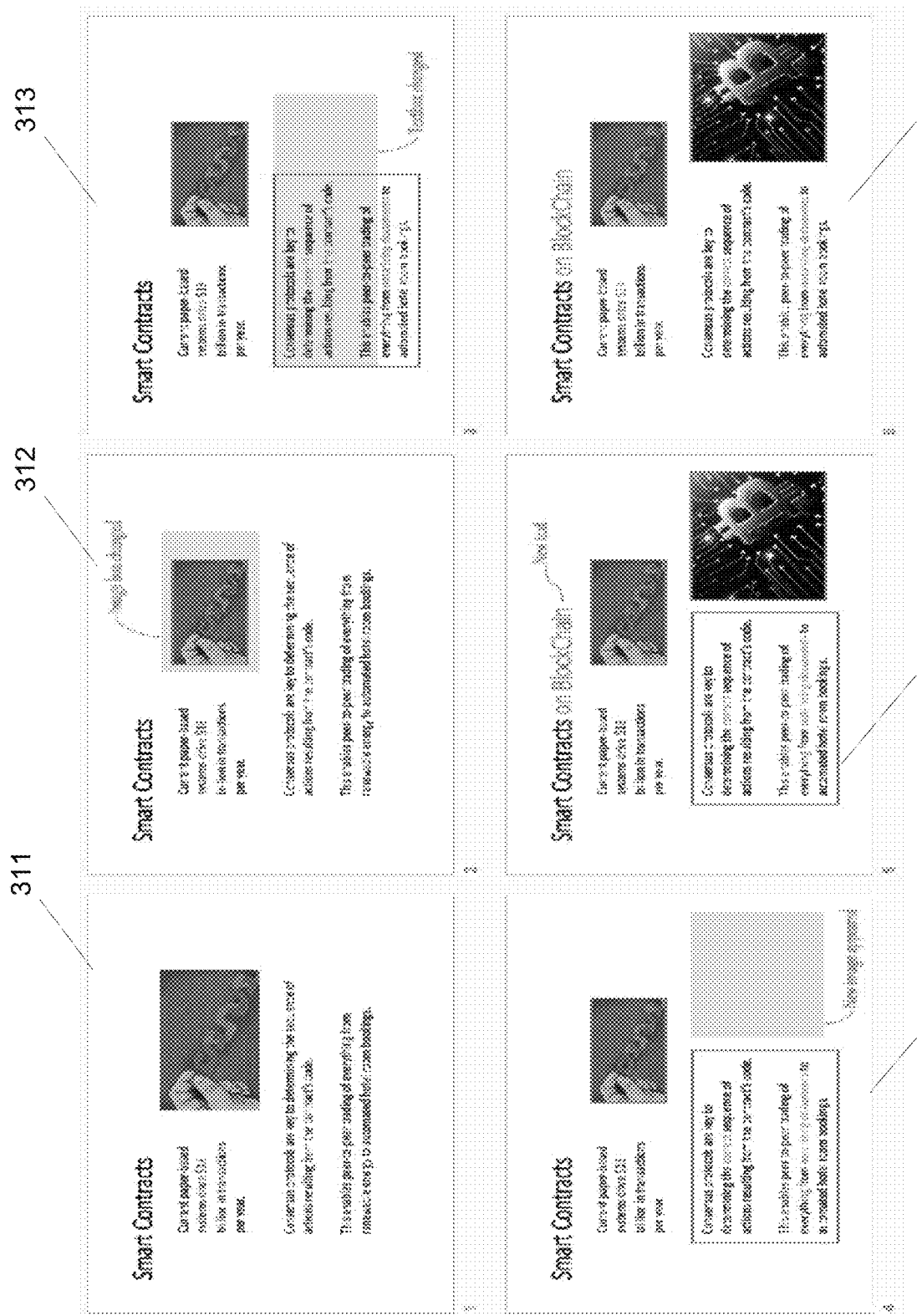
FIG. 3(b) illustrates an example of a generated animation, in accordance with an example implementation.

The system can also detect a change within an image/chart/graph. In such an example implementation, for a modification to an image (e.g., an object is added), the animation is configured to remove a portion of the previous image, and then transition to the newly added content. FIG. 3(*a*) illustrates an example animation involving the detection of a change within an image/chart/graph, in accordance with an example implementation. In the example of FIG. 3(*a*), a new hand was added to the image of 301, which is shown in the animation by removing the previous area at 302 and then adding the hand at 303.

If the document application platform provides information indicative of changes, such as either track changes or information regarding the history of edits, such information can also be processed to determine the text differences and/or the image differences between versions of documents as well, in accordance with the desired implementation.

Further, versions of documents can be managed as flat files for the same document, which are plain text or binary files indicating the text differences and the image differences between versions of documents. Flat file implementations can be beneficial for document databases, such that separate document files do not have to be managed for the same document, but rather changes can be extracted and incorporated from such text files into a master document instead to reflect the changes. Such files can be processed by example implementations to determine the desired changes.

Finally, some text or image elements might be new, such as the second image of S2 in FIG. 1(*b*). These will be animated using their position and size, along with or after other objects on the animation have been animated as described below.

Filtering Changes

Referring to FIG. 2, the next aspect involves filtering and ranking changes at 204. Not all changes need to be shown for an animated preview: the system can be parameterized so that some changes are not rendered, such as small changes in image position, rotation, contrast, border thickness, or small text attribute adjustments (e.g., such as changing font size from 11px to 11.5px or normal to bold style).

Animating Changes

In principle, several strategies can be used to animate changes and incorporated from a database of animation strategies 205. Example implementations can involve any animation strategy according to the desired implementation, including but not limited to leaving the text and images boxes untouched while changing the textual content first, changing the text and images boxes and then changing their content, changing everything at once, and so on.

The strategy selected depends on the kinds of changes. For example, in S2 from FIG. 1(*b*), the new image forced the user to resize the textbox. In an example implementation, text changes can be first illustrated, whereupon graphical elements are then added which then resizes the text boxed with their final content. In another example implementation, one could first change the boxes to fit the new graphical positions, and then change the textual content.

Finally, example implementations could execute both changes at the same time. Example implementations can also rank the changes based on their nature, (i.e. showing the important changes first). In the example of FIGS. 1(*a*) and 1(*b*), the example implementations would first change the position of text and image boxes, and then modify the text inside them.

Other animation strategies can also be applied in accordance with the desired implementation. For example, "anticipation" before removing an object, "slow-in slow-out" and "arc" when moving objects, "exaggeration" when showing font size changes or text insertions, and so on can be utilized when emphasizing text differences or image differences.

In addition, the animation can be tailored to emphasize specific aspects of the changes. For example, if a user mostly edits text, then the user is presumably more interested in seeing textual changes in subsequent versions. Alternatively, a designer who mostly edits graphics in the document will want to see predominantly the graphical changes. By incorporating information of the user opening the document, the animation can be dynamically tailored to user needs.

Another scenario is when a user is attaching a new version of a document to a messaging application (e.g., instant messaging, online forums, e-mail, text messaging on mobile devices, etc.); the example implementations can prompt the user with a dialogue box or by other methods for indicating a question such as "I am creating an animation showing the difference between this version of the document and the last, is there anything you want me to emphasize?" and the user can respond with, "Yes, slides 2 and 4" or "Yes, the graphics" or "Yes, the text" or "No, thank you!". Depending on the desired implementation, the animation can also use the surrounding text content (e.g. from messages in the chat application) to understand what parts of the document users are currently interested in. An example method that can be deployed for determining which part of a document users are referring to based on text messages in a chat application is described in U.S. application Ser. No. 15/490,784, herein incorporated by reference in its entirety for all purposes. Though such an example implementation, an importance ranking can be determined from user messages in a messaging application referencing one or more portions of the document. For example, user messages referencing particular slides in the document can thereby result in having differences in those slides be ranked higher in the importance ranking than other differences. User messages referencing particular differences in the document can also result in having those particular differences be ranked higher in the importance ranking than other differences. Such functions can be created according to the desired implementation.

Similarly, the importance ranking can be determined based on user selection in another example implementation. In this implementation, an interface (e.g., the dialog box as described above, user settings, etc.) can be provided and configured to facilitate selections on a priority of the text differences and the image differences. The user can therefore indicate preferences to indicate what is important in terms of differences to be emphasized.

At 206, the system can then provide animated previews of what changed in a presentation, which can be useful in several applications. One example implementation involves enterprise messaging applications, because users frequently post updates to documents as they collaborate. The animated previews are useful as they quickly convey what users should pay attention to in the new document version. Other areas could use such animations for previewing slides, replacing the default document thumbnails in desktop file systems or providing an option to show such changes, and visually showing changes in mobile applications where screen real-estate is reduced. In such an example implementation, the differences are ordered and ranked based on importance as determined according to the desired implementation, and then a subset of such differences are animated in a preview (e.g., as a thumbnail of the document or when a cursor is selecting the document).

FIG. 3(*b*) illustrates an example generated animation, in accordance with an example implementation. Specifically, FIG. 3(*b*) illustrates the slide 311 of the original or first version of the document, and slide 316 is the same slide of the most recent version or second version of the document, with the generated transition animation at 312-315. At 312, a bounding box animation is provided for the top image to indicate a change to the size of the image. At 313 a textbox is highlighted and the text changes are animated to show the text changes for the textbox. At 314, a box is animated to indicate where the new image will appear. At 315, another text box is highlighted to animate the new text that is added to the slide.

An example implementation of the application can involve an application applied in HTML5 that manages text boxes and images. The changes can be detected using the Longest Common Subsequence (LCS) algorithm or other change detection algorithms in accordance with the desired implementation. Images can also be matched using the CANVAS element of HTML5 for approximate changes by reducing them all to a nominal size of 256×256 pixels and applying a threshold-based image difference, however other image matching techniques can also be applied in accordance with the desired implementation.

FIGS. 4(*a*) and 4(*b*) illustrate example management information, in accordance with an example implementation. Specifically, FIG. 4(*a*) illustrates examples of user information for one or more users that have interacted with such documents. Such information can include the user ID, preferred animation settings as set through the interface, and types of changes made to documents. FIG. 4(*b*) illustrates examples of document information as managed by a document database. Such information can include the document, the underlying versions of the document, and any associated flat files indicating the text differences or image differences associated with the version.

Figure 5:
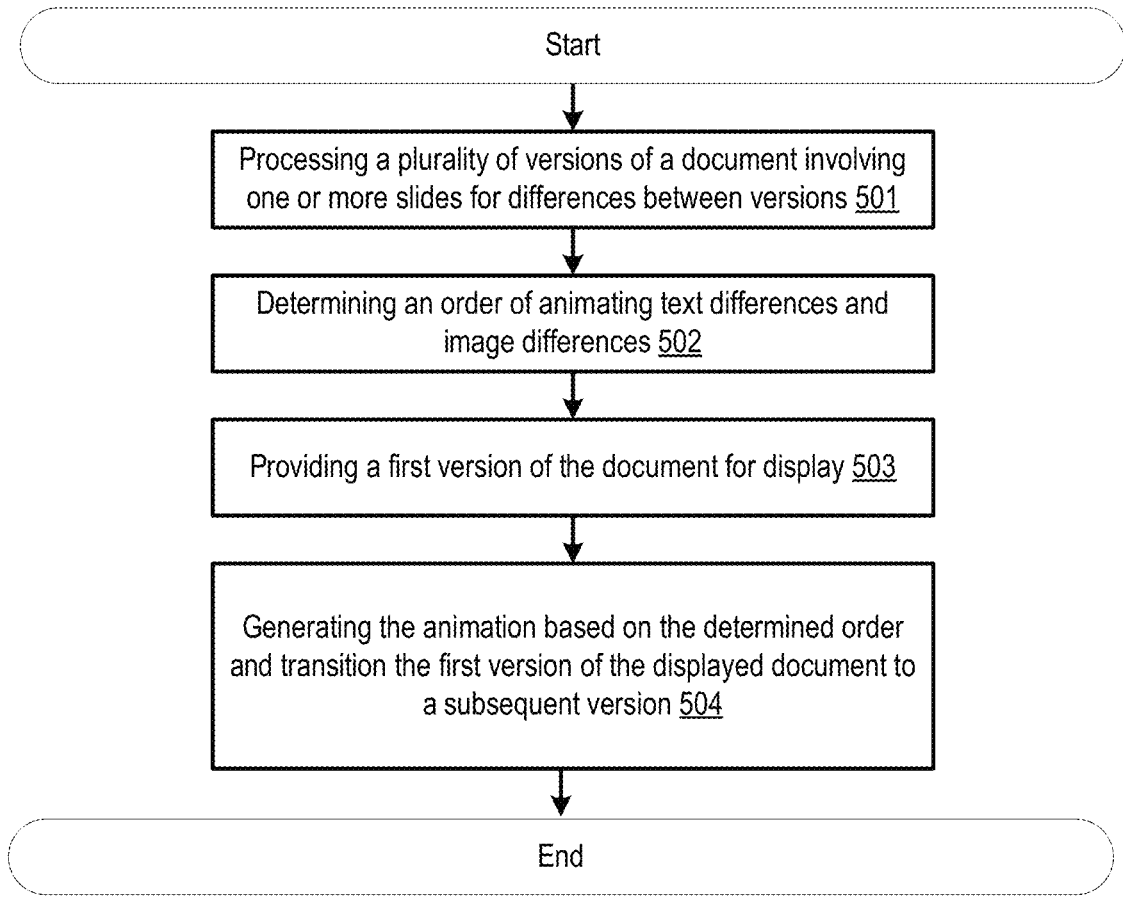
FIG. 5 illustrates an example flow diagram for the execution of an application layer over a document platform or messaging platform, in accordance with an example implementation.

FIG. 5 illustrates an example flow diagram for the execution of an application layer over a document platform or messaging platform, in accordance with an example implementation.

At 501, the application layer processes a plurality of versions of a document involving one or more slides for text differences and image differences between each of the plurality of versions. The plurality of versions can be retrieved through retrieving the document from the document database by referring to the document management information of FIG. 4(*b*) to determine and retrieve the appropriate document versions from the database. This can be accomplished from retrieving the documents themselves and/or from retrieving the flat files from the database.

As described herein, text differences and image differences can be processed by the application layer. The processing of the plurality of versions of the document for the text differences can involve identifying differences to text content, text position, font size, and font color. Other properties can also be included in accordance with the desired implementation. Similarly, the processing of the plurality of versions of the document for the image differences can involve identifying differences to image content, image position, and image size. Examples of such processing are described with respect to FIG. 2.

Such differences can be determined from information provided by the document platforms, from comparing different versions of documents, or from the use of flat files. For document platforms that make such information available, the text differences and image differences can also be derived from track change information and edit history information. In example implementations, flat files can also be utilized as described herein.

At 502, the application layer determines an order of animating the text differences and the image differences. Such order can be determined based on user information associated with a user opening the document by referring to the animation settings or the type of changes made from FIG. 4(*a*) to determine an order. For example, if the user explicitly sets settings to dictate a preference in the application layer, the settings can be utilized to determine the order of animation according to the desired implementation. Further, if it is a document that the user recently edited, such information can be recorded in the types of changes made and the types changes that the user previously made to the document are prioritized higher in the order of animations.

The generation of the animation can also be conducted based on a determined importance ranking, depending on the desired implementation. For example, given the order of differences as determined from 502, the differences can be further refined and filtered based on an importance ranking, with the filter set based on the number of changes, or removing repetitive changes that do not result in any differences. For example, if the changes include deleting and undeleting the same text, such repetitive changes can be filtered out from the differences to be used in generating the animation if the differences were derived from a history of edits information that recorded such changes. Further, other changes such as minor font changes or image changes (e.g., reducing the font by 0.5 pts, resizing the image by only a few pixels), may also not merit an animation and can just be presented without the animation depending on the desired implementation. In this manner, an importance ranking can also be based on a size of the text differences and/or the image difference in accordance with the desired implementation. The importance ranking can be a function that correlates importance with the size of the change in text or the image, in accordance with the desired implementation.

The importance ranking can be conducted based on the type of changes that the user wants to see or types of edits that the user made as determined from FIG. 4(a), or as according to the desired implementation. For example, user information that emphasizes text changes can involve an importance ranking in which larger block changes to text are determined to be more important than smaller text edits. If the user had modified the document previously, changes made in proximity to such modifications can be ranked more importantly than other changes.

Other rankings to determine importance can also be utilized according to the desired implementation, and the present disclosure is not limited to any particular implementation.

In example implementations, the importance ranking can also be based on presenting changes within the messaging platform by filtering the changes to prioritize only a select number of changes for generating a thumbnail animation to indicate the changes. For example, if a user submits the new version of the document to another user through the enterprise messaging platform, then an animation only reflecting a few of the most important changes can be generated, and the importance ranking can be conducted accordingly.

Afterwards, the order of differences can be determined from the remaining filtered changes based on the importance ranking.

At 503, the application layer provides a first version of the plurality of versions of the document for display. Depending on the context of the loaded document (e.g., based on the user opening the document), the first version to be displayed can be the previous version that the user accessed, the version immediately prior to the current version, or even the very first version of the document as loaded from the document database from referring to the management information of FIG. 4(b).

Further, depending on the desired implementation, either all of the document or a portion of the document can be provided as the first version of the document depending on the desired implementation. For example, if the document is being viewed through the messaging platform, one slide or one page from the document may be provided as a preview of the changes through the messaging system, or a thumbnail of a section of the document may be provided depending on the desired implementation. Such a page, slide or section can be determined based on the importance ranking as derived from 503. In this manner, the user can quickly understand the most important changes made to the document through the messaging system.

At 504, the application layer generates an animation transitioning the first version of the plurality of versions of the document to a second version of the plurality of versions of the document, the animation incorporating the text differences and the image differences between the first version and the second version. The second version of the document can be any of the versions subsequent to the first version, depending on the desired implementation. For example, the second version can be the immediately subsequent version of the document of the first version for an implementation that iterates the animation changes until the latest version of the document is reached, can be the most recent version of the document, or can be a specific version of the document that the user wishes to compare with the first version.

As described herein, multiple animations can be generated for documents that have multiple versions, or if the user wishes to traverse multiple versions. Example implementations can iteratively apply the flow as illustrated in FIGS. 2 and 5 to generate another animation transitioning the second version of the plurality of versions of the document to subsequent ones of the plurality of versions of the document, with the animation incorporating the text differences and the image differences between each of the subsequent ones of the plurality of versions. In this manner, the user can see the differences occurring between versions if multiple versions were created for the document (e.g., by multiple users, etc.)

Figure 6:
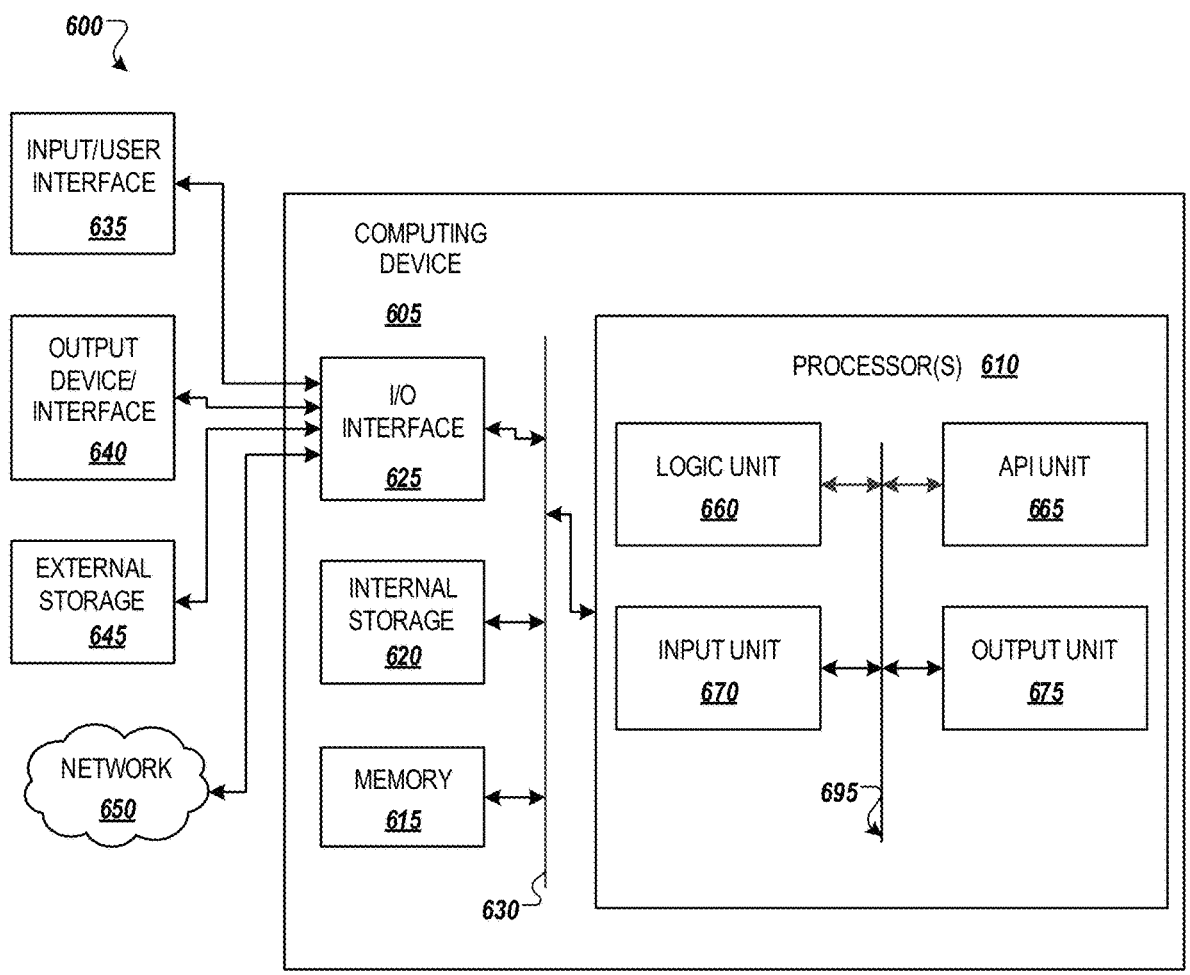
FIG. 6 illustrates an example computing environment with an example computer device suitable for use in some example implementations.

FIG. 6 illustrates an example computing environment with an example computer device suitable for use in some example implementations.

Computer device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computer device 605. I/O interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via I/O interface 625) to external storage 645 and network 650 for communicating with any number of networked components, devices, and systems, including one or more computer devices of the same or different configuration. Computer device 605 or any connected computer device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide output based on the calculations described in example implementations.

Memory 615 can be configured to store management information as illustrated in FIGS. 4(a) and 4(b) to facilitate information for processor(s) 610 to execute the functions as described in FIGS. 2 and 5 to present results as illustrated in FIGS. 1(a), 1(b), 3(a) and 3(b).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   detecting text differences and image differences between a plurality of versions of a document comprising one or more slides by comparing at least a first version of the plurality of versions to a second version of the plurality of versions, each of the one or more slides comprising one or more of text and images;
   providing the first version of the plurality of versions of the document for display; and
   generating an animation transitioning the first version of the plurality of versions of the document to the second version of the plurality of versions of the document, the animation incorporating the text differences and the image differences between the first version and the second version, the animation animating each of the text differences and the image differences in an order, wherein the generating the animation comprises:
      determining importance rankings for the text differences and image differences based on a reference to one or more portions of the document from user messages in a messaging application, and
      ranking the text differences and image differences according to the importance rankings, wherein the order is based on the ranking.

2. The method of claim 1, wherein the generating the animation comprises:
   determining the order of animating the each of the text differences and the image differences based on user information associated with a user opening the document.

3. The method of claim 1, wherein the detecting the text differences comprises identifying differences to text content, text position, font size, and font color, and wherein the animation incorporates the identified differences;
   wherein the detecting the image differences comprises identifying differences to image content, image position, and image size, and wherein the animation incorporates the identified differences.

4. The method of claim 1, wherein the detecting the text differences and the image differences comprises processing the plurality of versions for at least one of track change information and edit history information for the text differences and the image differences.

5. The method of claim 1, wherein the plurality of versions of the document are flat files.

6. The method of claim 1, wherein the generating the animation comprises:
   filtering ones of the text differences and the image differences based on the importance rankings; and
   determining the order of animating the filtered ones of the each of the text differences and the image differences based on the importance rankings.

7. The method of claim 6, wherein the importance rankings is based on a size of the text differences and the image differences.

8. The method of claim 6, wherein the importance rankings is based on selections made from a user through an interface configured to facilitate selections on a priority of the text differences and the image differences.

9. The method of claim 1, further comprising: generating another animation transitioning the second version of the plurality of versions of the document to subsequent ones of the plurality of versions of the document, the animation incorporating the text differences and the image differences between each of the subsequent ones of the plurality of versions.

10. The method of claim 1, wherein the generating the animation further comprises highlighting the most important text differences and image differences as determined by the importance rankings.

11. A non-transitory computer readable medium, storing instructions for executing a process through one or more processors, the instructions comprising:
    detecting text differences and image differences between a plurality of versions of a document comprising one or more slides by comparing at least a first version of the plurality of versions to a second version of the plurality of versions, each of the one or more slides comprising one or more of text and images;
    providing the first version of the plurality of versions of the document for display; and
    generating an animation transitioning the first version of the plurality of versions of the document to the second version of the plurality of versions of the document, the animation incorporating the text differences and the image differences between the first version and the second version, the animation animating each of the text differences and the image differences in an order, wherein the generating the animation comprises:
       determining importance rankings for the text differences and image differences based on a reference to one or more portions of the document from user messages in a messaging application, and
       ranking the text differences and image differences according to the importance rankings, wherein the order is based on the ranking.

12. The non-transitory computer readable medium of claim 11, wherein the generating the animation comprises:
    determining the order of animating the each of the text differences and the image differences based on user information associated with a user opening the document.

13. The non-transitory computer readable medium of claim 11, wherein the detecting the text differences comprises identifying differences to text content, text position, font size, and font color, and wherein the animation incorporates the identified differences;
    wherein the detecting the image differences comprises identifying differences to image content, image position, and image size, and wherein the animation incorporates the identified differences.

14. The non-transitory computer readable medium of claim 11, wherein the detecting the text differences and the image differences comprises processing the plurality of versions for at least one of track change information and edit history information for the text differences and the image differences.

15. The non-transitory computer readable medium of claim 11, wherein the plurality of versions of the document are flat files.

16. The non-transitory computer readable medium of claim 11, wherein the generating the animation comprises:
filtering ones of the text differences and the image differences based on the importance rankings; and
determining the order of animating the filtered ones of the each of the text differences and the image differences based on the importance rankings.

17. The non-transitory computer readable medium of claim 16, wherein the importance rankings is based on a size of the text differences and the image differences.

18. The non-transitory computer readable medium of claim 16, wherein the importance rankings is based on selections made from a user through an interface configured to facilitate selections on a priority of the text differences and the image differences.

19. The non-transitory computer readable medium of claim 11, further comprising: generating another animation transitioning the second version of the plurality of versions of the document to subsequent ones of the plurality of versions of the document, the animation incorporating the text differences and the image differences between each of the subsequent ones of the plurality of versions.

* * * * *